June 30, 1959 W. N. McLELLAN 2,892,717
PROCESS FOR RECOVERY AND DEHYDRATION OF SUGAR BEET TOPS
Filed April 19, 1957
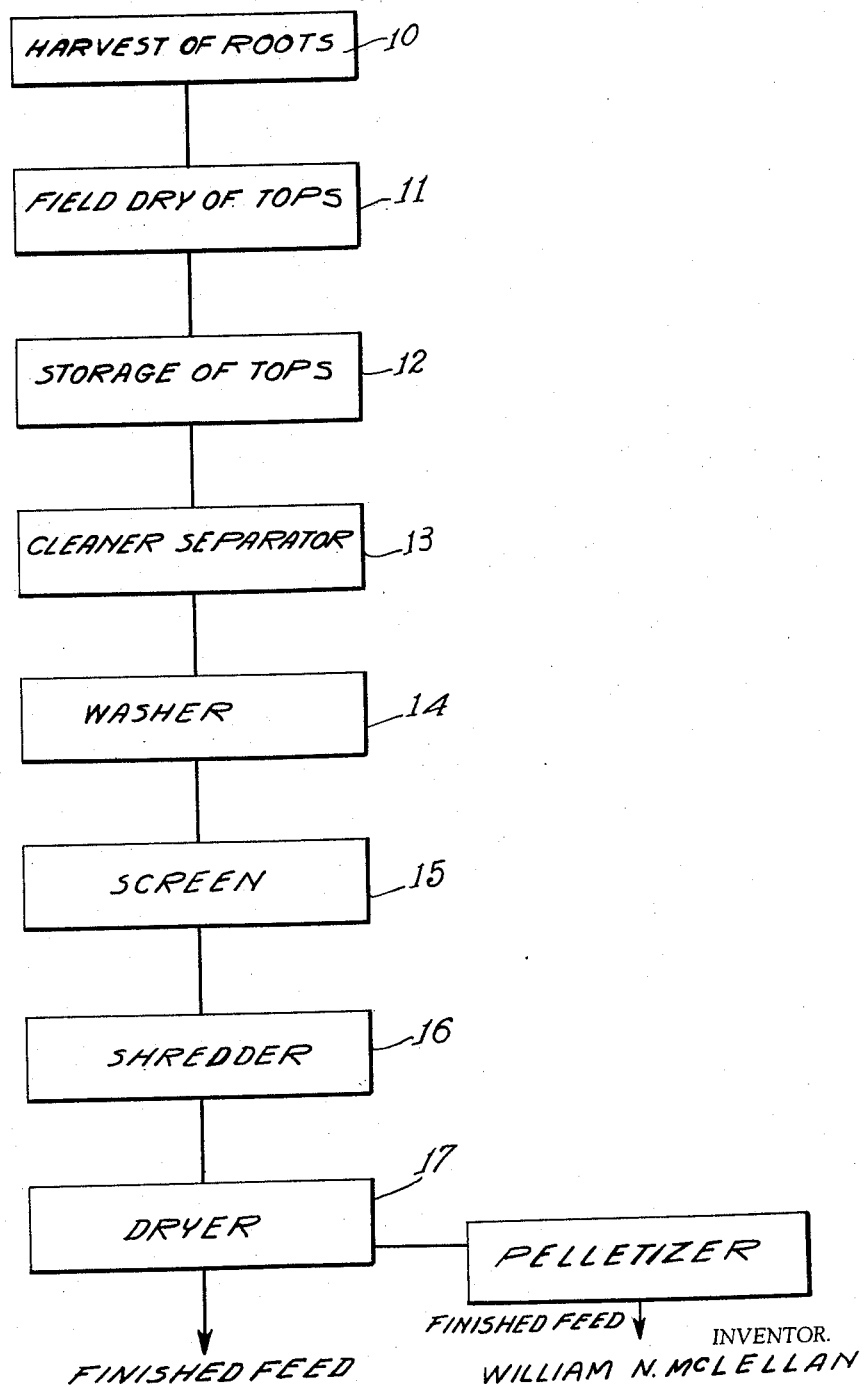
INVENTOR.
WILLIAM N. McLELLAN
BY
ATTORNEYS United States Patent Office 2,892,717
Patented June 30, 1959

2,892,717
PROCESS FOR RECOVERY AND DEHYDRATION OF SUGAR BEET TOPS

William N. McLellan, Santa Maria, Calif., assignor to Sinton & Brown Co., Betteravia, Calif., a corporation of California Application April 19, 1957, Serial No. 653,830

5 Claims. (Cl. 99—8)

This invention relates to a process of dehydrating sugar beet tops for conservation of the food quantities thereof for later use, particularly as a concentrated cattle food.

More and more recognition is being given to the fact that the lush green foliage in a sugar beet field possesses potential high feed value. In some sugar beet growing areas, it has been common practice for many years to pasture the tops with beef cattle or sheep after harvest of the roots is completed, and other attempts have been made such as ensiling the tops mixed with clover or other hay as a food for dairy cows. Such practice is moderately practicable in Midwestern United States or the Mountain States where most farms are integrated operations wherein each farmer raises some beets, hay, corn and a few cattle. Here the small scope of the operation of ensiling sugar beet tops makes such a program feasible. In the Western United States and particularly California, the conventional methods are practical only to a very limited extent. Field pasturing is at best only a marginal conversion of a valuable feed. In the interior valleys the hot dry climate of the harvest season quickly dries the leaves to such an extent that losses from shattering reduce the feed available to only a fraction of the total potential. In the coastal valleys early rains and dew or fog reduce the value of the tops as feed. Ensilage is impractical in the Western United States where both sugar beet farming and cattle feeding are conducted on a large scale, each independent from the other. The quantity of tops necessary for economic large scale feeding plants would require the gathering of supplies from such a large area that labor and transportation costs would be insuperable.

Accordingly it is one object of this invention to provide a process for utilizing sugar beet tops as a feed which involves dehydration of the tops. No economically feasible method of such dehydration, particularly on a large scale, has heretofore been provided although many attempts have been made.

In any system of harvesting beet tops, the tops must be collected either before or after the roots have been harvested.

Harvesting of the leaves before the roots has various disadvantages. The first of these rises from the fact of the high moisture content of the green leaves. In fresh tops 15% or less is dried substance with the result that approximately 6 tons of raw material must be handled to produce 1 ton of finished product. The cost of such is economically impossible.

Perhaps an even more serious objection to harvesting of the tops before the roots is that any attempt to harvest the tops from a whole field would require that trucks and equipment drive over the roots, making them difficult if not impossible to harvest. If the harvesting of the tops is geared to precede the harvesting of the roots by a matter of only a few rows of beets, a top harvester capable of handling 25 acres per day must be slowed to the operation of a root harvester with the rate of approximately 6 acres per day thus rendering the top harvesting again economically unfavorable.

It is accordingly another object of this invention to provide a method of harvesting sugar beet tops involving harvesting of said tops after the harvesting of the roots. In this process, after the harvesting of the roots, the tops are allowed to field dry to wilt the same until they have been reduced to a moisture content of 70%, thus doubling the dry material content.

It is a further object of this invention to provide an economic large scale method for harvesting and treating sugar beet tops involving the steps of harvesting as aforesaid, mechanically cleaning, thoroughly washing, shredding and dehydrating the sugar beet tops to a finished product.

These and other objects, features and advantages will be apparent from the annexed specification in which the figure illustrates diagrammatically the various steps in the process.

As stated above the first step in the process is the harvesting of the roots indicated by the box 10 of the diagram. In the harvesting of the roots, the tops, consisting of leaf, stem and crown, are left in the field to dry. This drying will last from one to six days depending upon climate conditions and is continued to a point where the moisture concentration in the tops is reduced to about 70%. This jumps the dry content of the tops and halves the freight-in per unit of finished product. Furthermore, if the leaves and crown are wet, dirt will adhere to them whereas if they are dry, such dirt can be shaken free during harvest. However, it will be noted that it is not proposed to reduce the moisture content to a point where leaf shatter occurs.

The field dried beet tops are windrowed and then loaded into self-unloading trucks by means of a windrow harvester. The trucks transport the tops to a storage area adjacent the dehydrating plant where they are dumped into low piles for processing. The above-identified field drying step is indicated by the box 11 and the storage by the box 12 of the annexed diagram. The storage step in this process is important in rendering the overall process economically advantageous. It is essential to operate the dryer 24 hours per day so an adequate supply of tops must be at all times available; yet it is important that no tops remain in storage more than 24 hours to prevent heating and decomposition. From the storage area, the tops are taken, as for example by a lift truck, and fed to a cleaner separator 13. As fed to the cleaner separator the tops will be a compact mass of leaves, stems, crowns, clods, rocks, bailing wire and the like which must be broken up for subsequent handling. The cleaner separator advantageously, therefore, provides a feeder belt which feeds the commingled matter to a high speed revolving drum provided with a plurality of sharp fingers for breaking up the compact mass and feeds the tops thus separated from clods and metal to a washer 14. The end roller supporting the feed belt of the cleaner separator is advantageously formed of a magnetic material, such as Alnico, for separating out metal which has been picked up in the field with the tops. The washer 14 is an inclined trough with an overhead chain drag conveyor to convey the tops up the incline against a countercurrent flow of water. Preferably the washer 14 is geared to provide a three minute washing cycle. One-half gallon of water per pound of tops is sprayed in jets along the length of the conveyor. This step rehydrates the dried leaves to prevent their burning in the dryer and raises the moisture content from 70% to 77% which is found to be optimum for dehydration.

From the washer 14, the beet tops are passed to a vibrating screen 15 to remove free water and from thence to a shredder 16 in which the tops are reduced to a size suitable for their subsequent dehydration, leaves, stems and crowns being separated from each other in this step. From the shredder 16 the shredded tops, stems and crowns are passed to a dryer 17. The dryer 17 is a comparatively low temperature operation with high air velocity. A practical dryer would be 10 feet, 6 inches in diameter and 48 feet long with an evaporating capacity of 60,000 pounds of water per hour. This dehydrator will operate on a parallel flow principle with the induced draft as the sole means of moving the material through the dryer. Inlet temperature will be approximately 1,200° F. and exhaust temperature 250° F. Average retention time for the crowns will be 40 minutes; however, the more easily and quickly dried leaves, due to their greater surface to weight ratio, will be more quickly propelled by the draft of hot air through the dryer than the more slowly dried crowns with the result that each is given the amount of time in the dryer required to perform the dehydration without burning. Proper baffling in the dryer and control of the induced draft is used to provide the 40 minute retention time of the crowns.

In any event, both the crown, stems and leaves are dehydrated in the dryer 17 to a moisture content of approximately 10%. It will be noted that this drying step is absolutely dependent upon shredding the leaves, stems and crowns apart, as if they should remain attached the air to weight ratio would be absolutely unpredictable and the air flow would not be utilizable to obtain the differential in the drying time above described.

After the beet tops have been dehydrated as aforesaid, they may be pelletized or merely sacked by conventional methods for subsequent use as finished feed.

While there has been described what is at present considered a preferred form of the present process, it will be apparent that certain changes and modifications could be made therein without departing from the essence of the invention, the most important elements of which are the washing step 14 and the shredding step 16 which permit the differential dehydrating in the dryer 17.

I claim:

1. The process of dehydrating sugar beet tops comprising: the steps of field drying said tops after harvesting of the roots to approximately double the dry material content thereof; gathering and storing said tops; cleaning and separating said tops from foreign matter; washing said tops to rehydrate said tops to a sufficiently high water content to prevent burning of said tops during the subsequent drying step; removing free water from said tops; shredding said tops to separate leaves, stems and crowns from each other; and drying said shredded tops to an approximate 10% moisture content.

2. The process set forth in claim 1 in which said washing step rehydrates said tops to approximately 77% moisture content.

3. The process set forth in claim 1 in which said shredded tops are propelled through a dryer solely by the air stream of the drying air.

4. The process set forth in claim 2 in which said shredded tops are propelled through a dryer solely by the air stream of the drying air.

5. The process set forth in claim 4 in which said drying air has an inlet temperature of approximately 1,200° F. and an outlet temperature of approximately 250° F.

References Cited in the file of this patent

UNITED STATES PATENTS

| | | |
|---|---|---|
| 1,003,525 | Skorzewski | Sept. 19, 1911 |
| 2,803,545 | Randolph | Aug. 20, 1957 |